(12) United States Patent
Song et al.

(10) Patent No.: US 9,483,078 B2
(45) Date of Patent: Nov. 1, 2016

(54) MOBILE TERMINAL

(71) Applicant: LG ELECTRONICS INC., Seoul (KR)

(72) Inventors: Insu Song, Seoul (KR); Yongjin Cho, Seoul (KR); Jaichul Kim, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 509 days.

(21) Appl. No.: 14/022,043

(22) Filed: Sep. 9, 2013

(65) Prior Publication Data

US 2014/0313746 A1    Oct. 23, 2014

(30) Foreign Application Priority Data

Apr. 17, 2013  (KR) .................. 10-2013-0042286

(51) Int. Cl.
*G06F 1/16* (2006.01)
*F21V 15/01* (2006.01)
*G02F 1/1333* (2006.01)

(52) U.S. Cl.
CPC .......... *G06F 1/1637* (2013.01); *G06F 1/1626* (2013.01); *G02F 1/133308* (2013.01)

(58) Field of Classification Search
CPC ..................... G06F 1/1626; G06F 1/1637
USPC ................. 362/97.1–97.4; 349/122–137; 361/679.26, 679.3
See application file for complete search history.

(56) References Cited

U.S. PATENT DOCUMENTS

| | | | |
|---|---|---|---|
| 7,188,965 B2* | 3/2007 | Chang | G02F 1/133608 362/627 |
| 2003/0133207 A1* | 7/2003 | Minami | G02B 5/20 359/885 |
| 2005/0195621 A1* | 9/2005 | Chang | G02F 1/133608 362/634 |
| 2006/0061859 A1* | 3/2006 | Chen | G02F 1/133308 359/443 |
| 2009/0195973 A1* | 8/2009 | Yee | H01L 51/0096 361/679.21 |
| 2009/0213292 A1* | 8/2009 | Park | G02F 1/13452 349/58 |
| 2012/0113351 A1* | 5/2012 | Cheng | G02F 1/133308 349/58 |
| 2014/0009914 A1* | 1/2014 | Cho | G09F 9/35 362/97.3 |

FOREIGN PATENT DOCUMENTS

| | | |
|---|---|---|
| KR | 10-0721702 | 5/2007 |
| KR | 10-2009-0069022 | 6/2009 |
| KR | 10-2012-0116632 | 10/2012 |

* cited by examiner

*Primary Examiner* — Renee Chavez
*Assistant Examiner* — Colin Cattanach
(74) *Attorney, Agent, or Firm* — Lee, Hong, Degerman, Kang & Waimey

(57) ABSTRACT

There is disclosed a mobile terminal including a display unit, a first film having one surface coated with a first adhesive material, the surface coupled to a back surface of the display unit by the first adhesive material, and a front case having a second adhesive material disposed on one surface thereof, the surface coupled to the other surface of the first film by the second adhesive material, wherein an adhesive strength of the first adhesive material is smaller than an adhesive strength of the second adhesive material, such that the back surface of the mobile terminal may be attached to the case to prevent the bezel from increasing.

16 Claims, 10 Drawing Sheets

MOBILE TERMINAL

CROSS REFERENCE TO RELATED APPLICATIONS

Pursuant to 35 U.S.C. §119(a), this application claims the benefit of earlier filing date and right of priority to Korean Application No. 10-2013-0042286, filed on Apr. 17, 2013, the contents of which are hereby incorporated by reference herein in their entirety.

BACKGROUND OF THE DISCLOSURE

1. Field of the Disclosure

The present invention relates to a mobile terminal that is able to reduce a bezel in an edge portion of a display module provided therein and to separate a display unit smoothly and efficiently for repairs.

2. Discussion of the Related Art

Generally, terminals can be classified into mobile terminals and stationary terminals. In addition, the mobile terminals can be further classified into handheld terminals and vehicle mount terminals.

Further, a mobile terminal can perform various functions such as data and voice communications, capturing images and video via a camera, recording audio, playing music files and outputting music via a speaker system, and displaying images and video on a display.

As functions of a mobile terminal becoming more diverse, a display unit is an important part of a mobile terminal and mobile terminals having larger screens have been launched. As such a display unit is getting larger, there is a disadvantage that the size of such a mobile terminal is getting larger. Users require a new design of a mobile terminal having an enlarged display unit while preventing the increase of the overall size.

SUMMARY OF THE DISCLOSURE

An object of the present invention is to provide a mobile terminal that is able to reduce a bezel in an edge portion of a display module provided therein and to separate a display unit smoothly and efficiently for repairs.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a display unit; a first film having one surface coated with a first adhesive material, the surface coupled to a back surface of the display unit by the first adhesive material; and a front case having a second adhesive material disposed on one surface thereof, the surface coupled to the other surface of the first film by the second adhesive material, wherein an adhesive strength of the first adhesive material is smaller than an adhesive strength of the second adhesive material.

The first film may include a non-attaching end not attached to the front case by the second adhesive material.

The front case may include a hole formed, corresponding to the non-attaching end.

The non-attaching end may be a corner of the first film0 and the hole may be positioned in a corner of the front case.

The non-attaching end may include a projection projected convexly.

The non-attaching end may be formed by cutting away a corner of the first film in a stepped shape.

An angular portion of the non-attaching end may be rounded.

The second adhesive material may not be coated on at least one corner of the front case and the at least one corner may not be attached to the first film.

The mobile terminal may further include a second film to one surface facing the first film and the other surface facing the front case, disposed between the front case and the first film, the second film having the one surface coated with a third adhesive material and the other surface coated with the second adhesive material.

The first adhesive material coated on the surface of the first film may include silicon.

The third adhesive material may include Trimethylated silica.

The first film may include one of Polyethylene Terephthalate, Polyethylene and Polypropylene.

The first adhesive material of the first film may have an adhesive strength in a range from 3 gf/in to 30 gf/in.

The mobile terminal may further include a window glass coupled to a front surface of the display unit, with being extended longer than the display unit in a vertical direction; and a window tape coupled to an extended portion of the window glass to be attached to the front case.

The display unit may be an organic light emitting diode (OLED).

The display unit may be bent curvedly, and the front case may be bent curvedly, corresponding to the shape of the display unit.

According to at least one embodiment, the back surface of the display unit may be attached to the case, such that the size of the bezel positioned in an edge portion can be prevented from increasing.

Furthermore, the large area of the back surface of the display unit may be attached to the front case and a predetermined adhesive strength or more can be recurred. When separating the display 151 from the front case, the user can apply a predetermined force to the end of the first film and separate the display unit easily. Accordingly, the damage to the display unit can be prevented.

It is to be understood that both the foregoing general description and the following detailed description of the embodiments are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

In the following detailed description, reference is made to the accompanying drawing figures which form a part hereof, and which show by way of illustration various embodiments.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The various features described herein may be applicable to a various types of mobile terminals. Examples of such terminals may include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification may also be applicable to a fixed terminal such as a digital TV, a desktop computer and the like as well as a mobile terminal.

Figure 1:
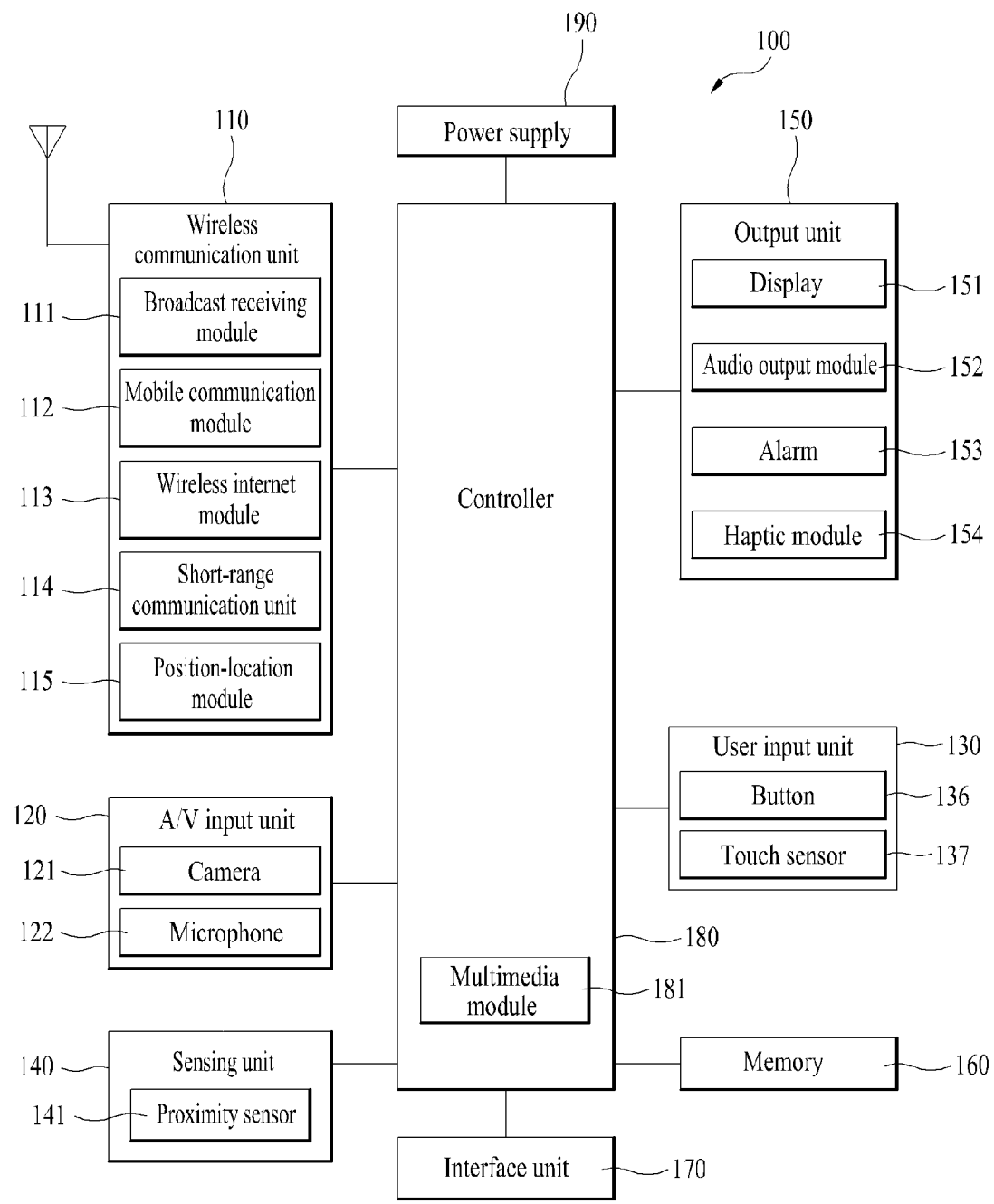
FIG. 1 is a block diagram of a mobile terminal according to one embodiment of the present invention.

FIG. 1 is a block diagram of a mobile terminal 100 in accordance with an embodiment as broadly described herein. The mobile terminal 100 may include a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transmission and reception, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151 of the output unit 150.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 may include assorted noise removing algorithms to remove noise generated in the course of receiving the external audio signal.

The user input unit 130 may generate input data responsive to user manipulation of an associated input device or devices. Examples of such devices include a button 136 provided to front/rear/lateral side of the mobile terminal 100 and a touch sensor (pressure sensitive touch/capacitive touch) 137 and may further include a key pad, a dome switch, a jog wheel, a jog switch and the like.

The sensing unit 140 may provide sensing signals for controlling operations of the mobile terminal 100 using status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such a sensing unit 140 may include, a gyro sensor, an acceleration sensor, a geomagnetic sensor and the like.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 may include a proximity sensor 141.

The output unit 150 may generate outputs relevant to the senses of sight, hearing, touch and the like. The output unit 150 includes the display 151, an audio output module 152, an alarm unit 153, and a haptic module 154 and the like.

The display 151 may be implemented to visually display (output) information associated with the mobile terminal 100. For instance, if the mobile terminal is operating in a phone call mode, the display may provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittable type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 may be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor may be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
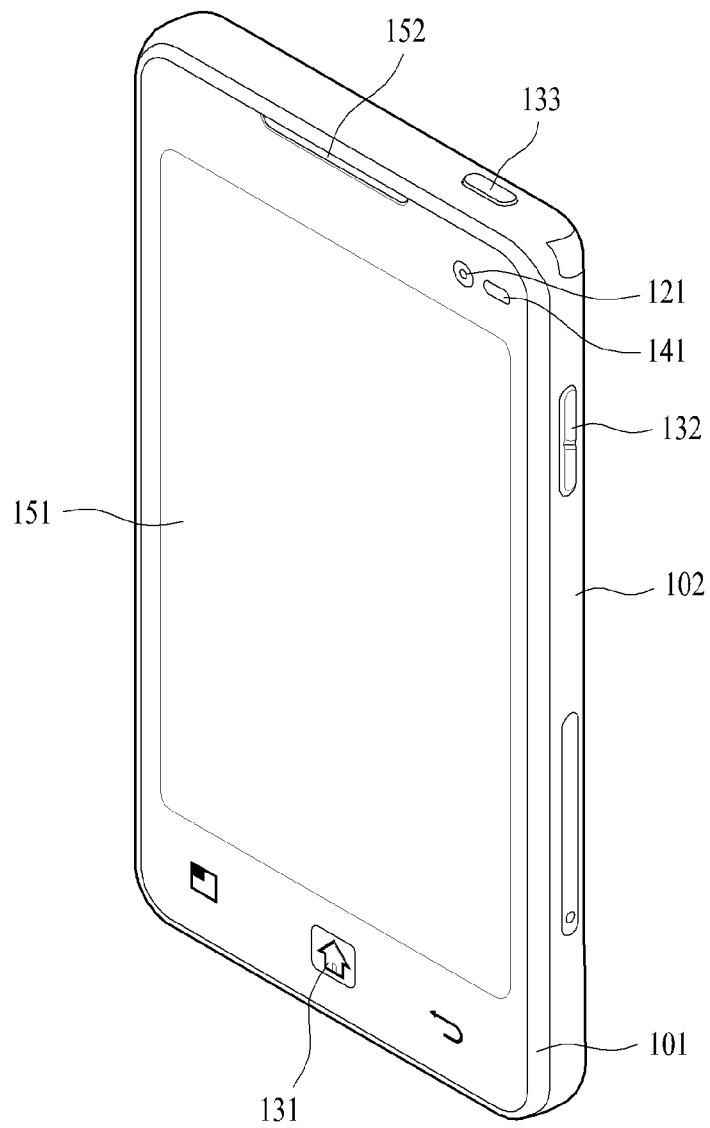
FIG. 2 is a front perspective diagram of the mobile terminal according to one embodiment of the present invention.

Referring to FIGS. 1 and 2, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 may control the overall operations of the mobile terminal 100. For example, the controller 180 may performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Next, FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case 101, 102, 103 configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part such as a battery, a USIM card, a memory card and the like. In doing so, the rear case 102 may further include a backside cover 103 (see FIG. 3) configured to cover the surface of the rear case 102. In particular, the backside cover 103 has a detachable configuration for the user's convenience. If the backside cover 103 is detached from the rear case 102, the surface of the rear case 102 is exposed.

If the backside cover 103 is attached to the rear case 102, a lateral side of the rear case 102 may be exposed in part. If a size of the backside cover 103 is decreased, a rear side of the rear case 102 may be exposed in part.

The cases 101, 102 and 103 can be formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 170 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the third manipulating unit 133.

A button type is configured to recognize a pressure applied by a user to each of the manipulation units 131, 132 and 133. If a touch sensor is provided to each of the manipulation units 131, 132 and 133 in addition to the display 151, a user's command can be inputted by a user's touch.

Figure 3:
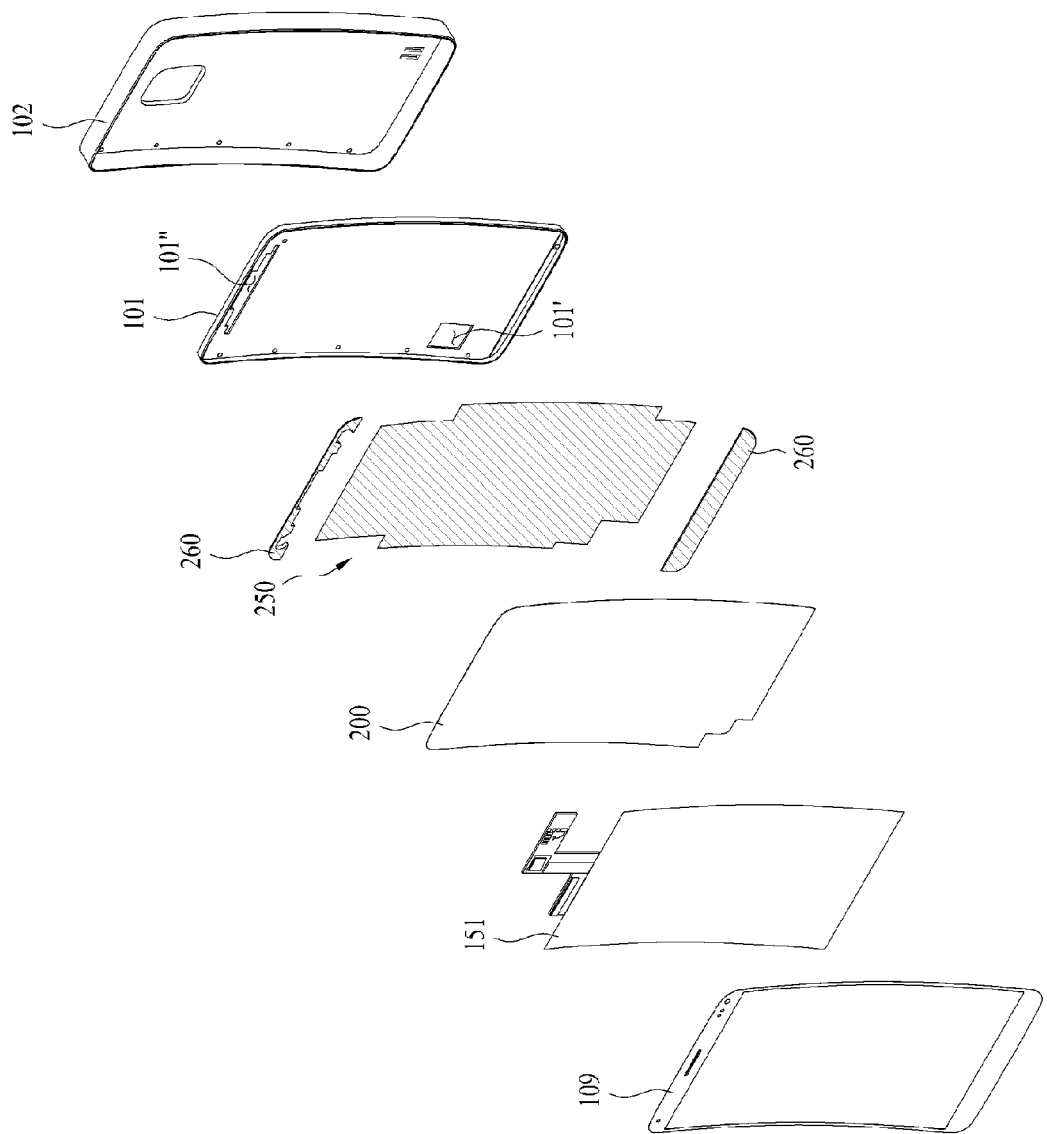
FIG. 3 is an exploded perspective diagram of a display unit and a front case that are provided in the mobile terminal according to one embodiment of the present invention.
Figure 4:
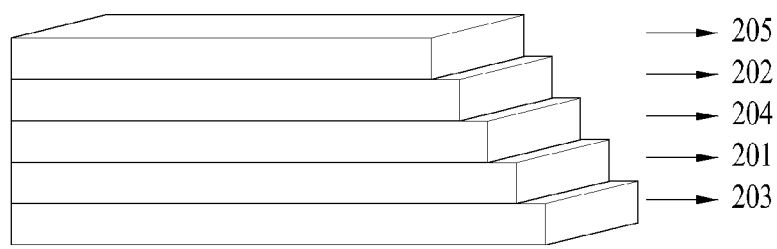
FIG. 4 is a conceptual diagram illustrating a first film according to one embodiment.

FIG. 3 is an exploded perspective diagram of a display 151 and a front case 101 that are provided in the mobile terminal according to one embodiment of the present invention. FIG. 4 is a sectional diagram of the display 151 coupled to the front case 101 of the mobile terminal according to one embodiment. Referring to FIGS. 3 and 4, there are shown a window glass 109, a display 151, a first film 200, a second adhesive material 252 and a front case 101.

The display unit according to this embodiment may be applied to a linear bar type mobile terminal as shown in FIG. 2 or to a mobile terminal 100 having a middle portion curvedly bent toward a back surface. A front case 101 attached to a back surface of the curvedly bent display 151 is curvedly bent in a shape corresponding to the curved shape of the display 151.

As mentioned above, the display 151 is a device configured to output images. A liquid crystal display, a thin film transistor, an organic light emitting diode may be used as the display 151. Recently, the organic light emitting diode (OLED) is used a lot because it can output sharp and clear images, with a slim appearance. The organic light emitting diode requires not back light unit and self-luminescent such that it can realize the curved display 151.

A touch sensor 137 may be provided in a front surface of the display 151 and converts a user's touch into an electrical signal to transmit the converted electrical signal to the controller 180.

The window glass 109 may be fabricated of transparent glass or transparent plastic and it may be coupled to the front surface of the display unit 150 to protect the display 151. The other edge area except a displaying area positioned in a central portion of the display 151 is printed to protect the non-displaying area.

The window glass 109 may provide a predetermined space where an audio output unit 152, a camera 121, a user input unit 131 and the like positioned in the front surface of the mobile terminal are arranged as well as the display 151. Accordingly, the window glass 109 may be formed larger than the display 151. The audio output unit 152, the camera 121 and the user input unit 131 may be above and below the display 151, such that it may be formed larger than the display 151 especially in a vertical direction.

FIG. 3 is an exploded perspective diagram of the display 151 and the front case 101 provided in the mobile terminal according to one embodiment of the present invention. Referring to FIG. 3, there are shown the window glass 109, the display 151, the first film 200, a second film 250, the front case 101 and the rear case 102.

The display 151 according to the embodiment may be coupled to a surface of the front case 101 via the first film 200 and the second film 250.

Figure 10:
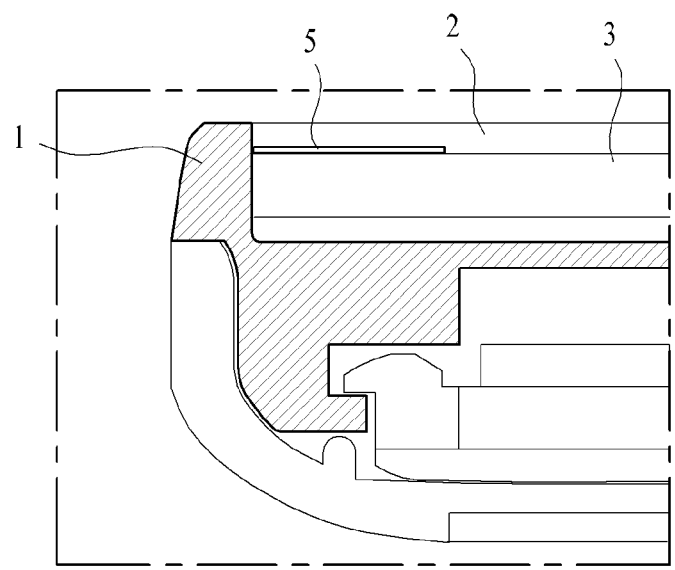
FIG. 10 is a sectional diagram illustrating a conventional display unit and a conventional front case.

According to a conventional method for fixing a conventional display unit 3, referring to FIG. 10 a window glass 2 is coupled to a front case 1 in an edge area of a front surface of a display unit 3. A double-sided tape 5 is adhered to the edge area of the display unit 3 to adhere the display unit 3 to a back surface of the window glass 2. Such a conventional fixing structure requires that the double-sided tape should have a predetermined size or more and a predetermined thickness or more to for secure fixing of the display unit 3.

However, in a recent design trend that the size of bezel located around the display unit 3 is reduced more and more, the width of the double-sized tape 5 has to be too decreased to secure a sufficient adhesive strength.

In this embodiment different from the conventional method, the back surface of the display 151 is adhered to secure a sufficient adhesive strength and no double-sized tape has to be used in a front edge area, such that the size of the bezel can be reduced.

Here, when the display 151 is separated from the front case for a repair in case a strong adhesive is disposed between the back surface of the display 151 and the front case 101 directly, ends of the display 151 might be bending because of the strong adhesion of the double-sided tape and the display 151 might damaged disadvantageously.

To solve such a disadvantage, only the second film having a strong second adhesive material 252 coated thereon is not used in the embodiment. The first film 200 having a first adhesive material 202 with a less strong adhesion coated thereon may be additionally provided, such that a coupling structure configured to ease the separation of the display 151 there from can be provided.

FIG. 4 illustrates a layer structure of the first film 200 according to one embodiment and the first film has a layer structure similar to a structure of a liquid crystal protection film.

Basically, a first adhesive material 202 is coated on one surface of a base film 201 that is smooth. The base film 201 is formed of one of polyethylene terephthalte, polyethelene and polypropylene.

A coating layer 200' may be formed on the other opposite surface where the first adhesive material 202 is not coated. A primer layer 204 may be formed to enable the first adhesive material 202 coated well before coating the first adhesive material 202 on one surface of the base film 201.

On the primer layer 204 may be coated the first adhesive material 202 that is Silicon PSA such as trimethylated silica. A release film 205 is coated on the first adhesive material 202 to protect the first adhesive material 202. The release film 205 is eliminated when the first film 200 is coupled to the display 151, such that anti-static treatment may be enabled.

The first film 200 used in the embodiment has an adhesive strength of 3 gf/in and more and 30 gh/in or less. That range is changeable according to the size and weight of the mobile terminal 100 and the adhesive strength of the first adhesive material 202 is smaller than that of a second adhesive material 252 formed on the second film 250 which will be described later.

When attached to a smooth surface, the resistance of the first film 200 having the first adhesive material 202 coated thereon is larger by a horizontal direction force. Once attached to a bonding surface, the first film 200 is difficult to separate by a force applied along the bonding surface. However, the first film 200 is easily separated when one end thereof separated from the bonding surface is held and pulled.

In other words, the first film can be easily separated by the force focused on an end portion of each corner and it is no need to apply an immoderate force when the display 151 is separated from the front case 101. Also, there is no adhesive material on the bonding surface after the first film 200 is separated and the separated display 151 can be reused and the adhesive performance can be maintained at high temperatures.

The back surface of the display 151 forms the smooth surface for uniform reflection of lights. Accordingly, when using the first film 200, the display 151 can be easily adhered or separated. When the back surface of the display 151 is smooth, the first film 200 can be attached even to a curved display 151.

The second film 250 is adhered to the other side of the first film 200 opposite to the side where the first adhesive material 202 is coated, such that the second film 250 is coupled to the front case 101.

Figure 5:
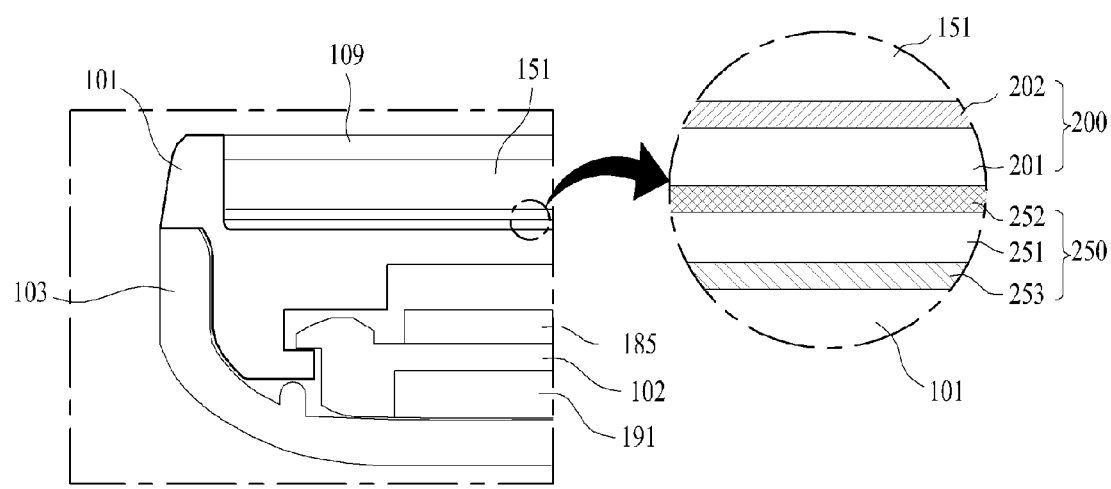
FIG. 5 is a sectional diagram of the display unit coupled to the front case of the mobile terminal according to one embodiment of the present invention.

FIG. 5 is a sectional diagram illustrating a mobile terminal according to one embodiment. FIG. 5 shows a front case 101, a rear case 102, a main circuit board 185, a battery 191, a back cover 103, a window glass 109, a display panel 151, a first film 200 and a second film 250.

Electronic components including the main circuit board 185 may be mounted in a predetermined space formed between the front case 101 and the rear case 102. The battery 191 is loaded in a back surface of the rear case 102. The back cover 103 is coupled to a back surface of the rear case 102 to cover the battery 191. In case the battery 191 is an embedded type, the back cover 103 can be omitted.

The main circuit board 185 has various electronic components mounted thereon and it is provided as the controller 180 configured to control functions of the mobile terminal 100. The main circuit board 185 is connected with the display 151, the audio output module 152 and the camera 121, to transmit and receive a signal. The information acquired by the electronic components including the display 151, the audio output module 152 and the camera 121 may be transmitted to the main circuit board 185 or signals may be transmitted to the display 151 from the main circuit board 185, such that the operations of the mobile terminal.

The first film 200 and the second film 250 are disposed between the display 151 and the front case 101. According to this embodiment, to form the second film 250, a second adhesive material 252 is coated on one surface of the base film 251 and a double-sided tape having a third adhesive material 253 coated thereon is attached on the other surface of the base film 251.

Figure 6:
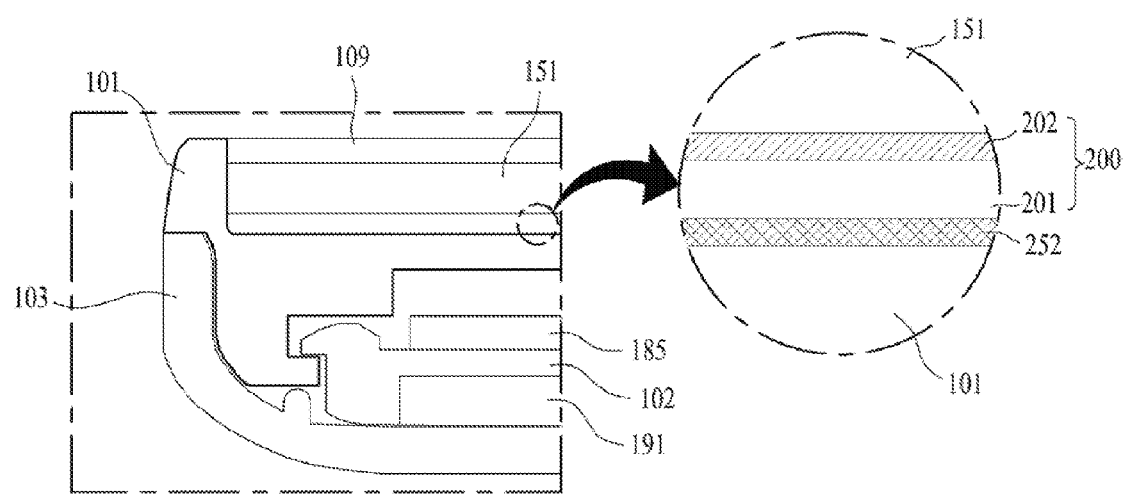
FIG. 6 is a sectional diagram of a display unit coupled to a front case of a mobile terminal according to another embodiment of the present invention.

The adhesive strength of the second and third adhesive materials 252 and 253 is larger than that of the first adhesive material 202, such that the display 151 may be coupled to the front case 101 stably. A double-sided type second film 250 may be used. Alternatively, the second adhesive material 252 may be directly coated on one surface of the front case 101 according to another embodiment shown in FIG. 6. For explanation sake, the embodiment using the second film will be described as follows. However, the present invention is not limited thereto.

Figure 7:
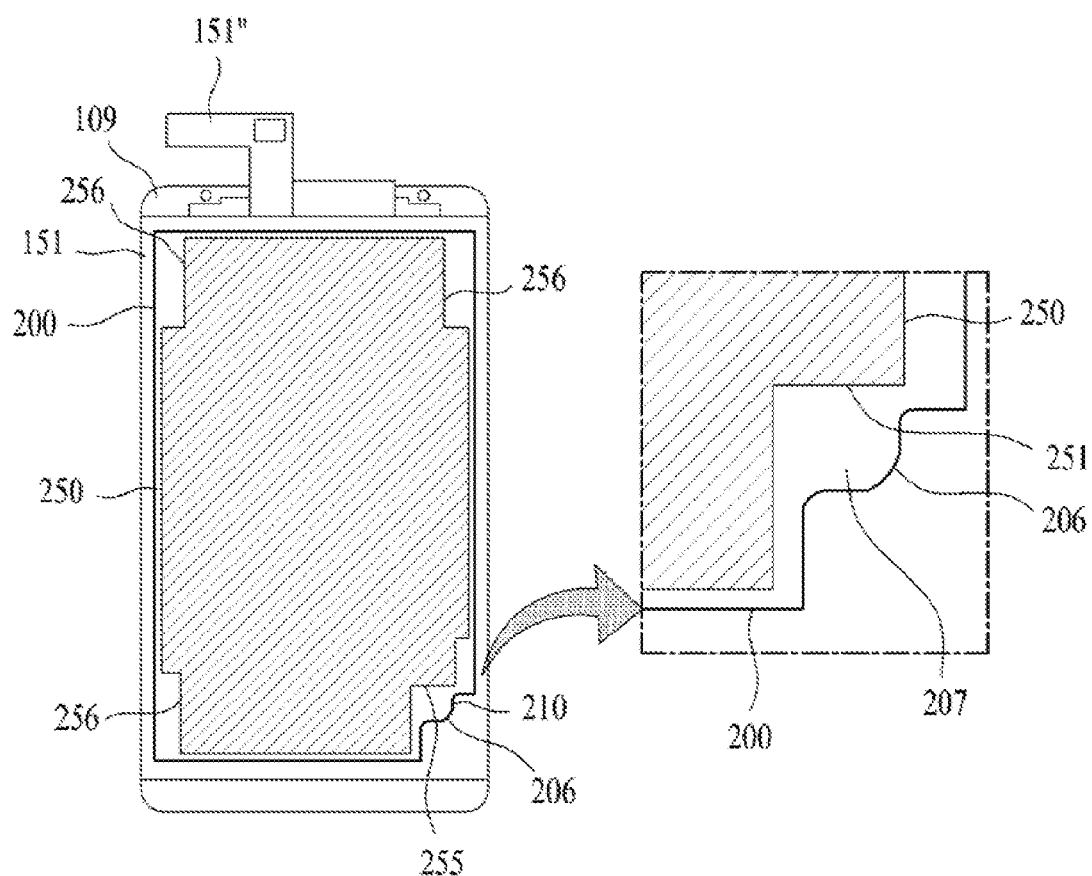
FIG. 7 is a rear diagram illustrating a first film and a second film that are disposed on a back surface of the display unit provided in the mobile terminal according to the embodiment of FIG. 6.

FIG. 7 is a diagram illustrating a state where the first film 200 and the second film 250 are attached to the back surface of the display 151. A back surface of the first film 200 has a predetermined portion where the second film 250 is not attached, in other words, a non-attaching end 206.

Figure 8:
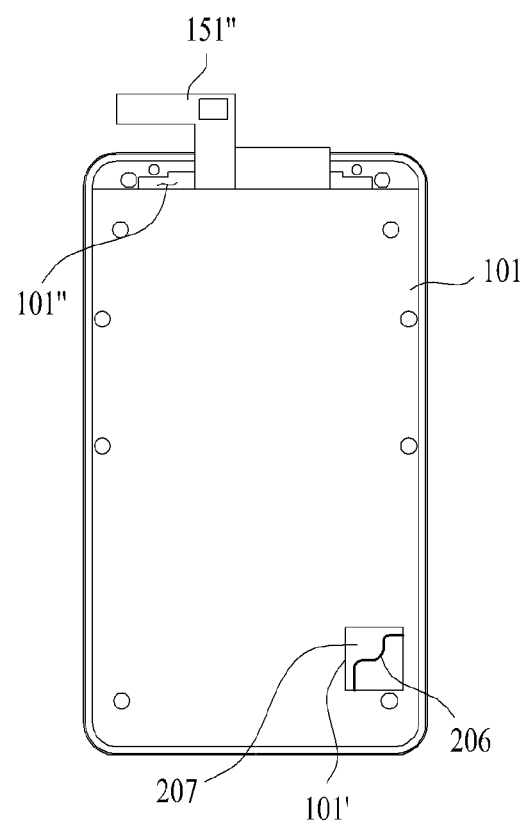
FIG. 8 is a rear diagram of the front case coupled to a back surface of the display unit shown in FIG. 7.

Such a non-attaching end 206 of the first film 200 is not attached to the front case 101 and it may form a hole 101' located in a predetermined position corresponding to a non-attaching end of the front case 101. The non-attaching end 206 is exposed to the back surface of the front case 101 via the hole 101' as shown in FIG. 8.

A user can separate the display 151 from the first film 200 by holding the non-attaching end 206. As mentioned above, the first film 200 can be separated even by the force applied to the corner of the first film. Accordingly, the display 151 can be separated from the front case 101, without damage to the display 151.

A projection 207 may be formed at the corner of the first film 200 to allow the user to come off the non-attaching end 206 with the nail. An angular portion of the corner or projection could hurt the finger or hand can hurt when the user tries to hold the non-attaching end 206. Accordingly, the corner of the non-attaching end 206 or the projection 207 can be rounded or cured as shown in FIG. 4.

Especially, when the non-attaching end 206 is located in one corner, the user hold the non-attaching end 206 with the fingers and applies a force in a diagonal direction, only to separate the first film 200 to separate the display 151 and the front case 101 easily.

To provide the non-attaching end 206 in the corner of the first film 200, the corner 255 is cut away as shown in FIG. 7 and the non-attaching end 206 not attached to the front case 101 may be formed in the corner of the first film 200.

The first film 200 is a little smaller than the front case 101. Even though the hole is formed nearest to the corner in using the corner of the first film 200 as the non-attaching end 206, the non-attaching end 206 can be sided, not positioned in a central portion of the hole. To locate the non-attaching end 206 in the central portion of the hole, the corner of the first film 200 is cut away in stepped shape and then the projection 207 is formed in the step-shaped corner of the first film 200, such that the non-attaching end 206 may be located in the center of the hole 101'.

FIG. 8 is a rear diagram of the front case 101 coupled to a back surface of the display unit shown in FIG. 7. The hole 101' is formed corresponding to the eliminated corner 255 of the second film 250 and the second film 250 is not exposed via the hole 101'.

After the rear case 102 is separated from the front case 101, the non-attaching end 206 of the first film 200 exposed via the hole 101' of the front case 101 may be held by the user as shown in FIG. 8.

Figure 9:
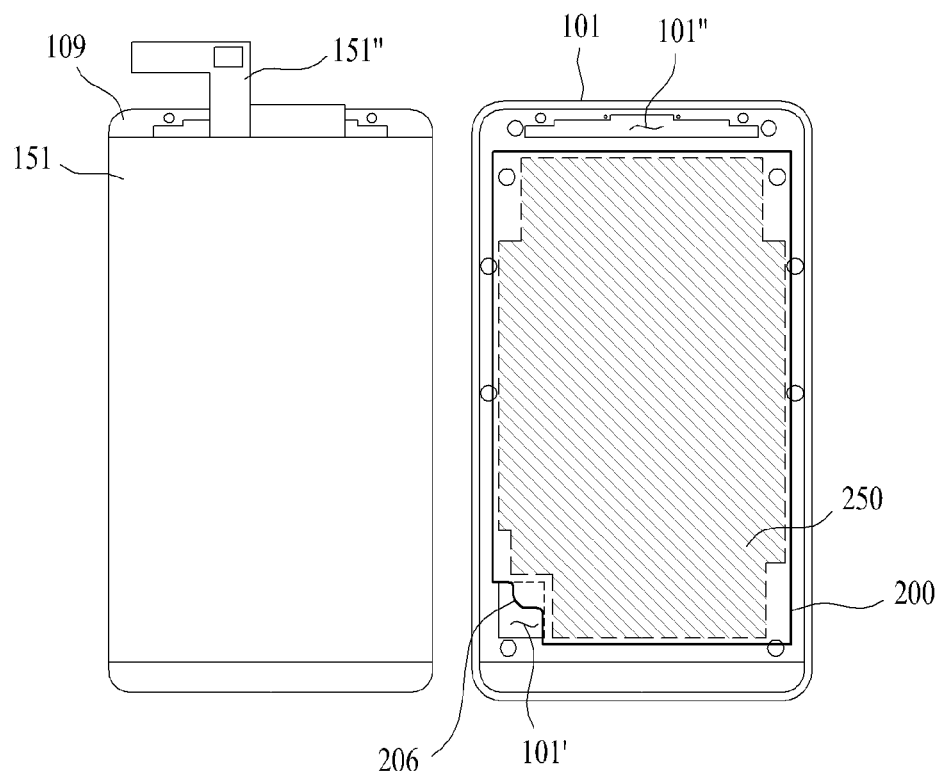
FIG. 9 is a plane diagram illustrating the display unit and the front case that are separated from the mobile terminal.

When the non-attaching end 206 is pulled in a diagonal direction, the first film 200 is separated from the back surface of the display 151. After that, the second film 250 and the first film 200 are located on the front case 101 and only the display 151 can be separated there from as shown in FIG. 9.

Meanwhile, the other corner 256 of the second film 250 may be eliminated except the corner 255 eliminated to expose the non-attaching end 206 to the first film 200. That is because corners of the display 151 subject to an external shock might be damaged easily, if the display 151 is attached to the front case 101 even to all corners.

In other words, the corner of the display 151 may not be attached to the front case 101. When an external shock of colliding the display 151 against the floor, a predetermined space can be provided where the corners of the display 151 can move.

As shown in FIG. 3, a window tape 260 may be further provided to attach the window glass 109 and the front case 101 exposed to upper and lower portions of the display 151 to each other. The window tape 260 is not adhered to the display unit directly. When separating the display 151 from the front case 101, no force is applied to the display 151 and the display 151 may not be damaged or broken.

The portion adhered by the window tape 260 is separated from the front surface and the first film 200 exposed via the hole 101' shown in FIG. 8 is separated from the back surface in a diagonal direction, such that the display 151 and the front case 101 may be separated from each other.

The front case 101 may further include a hole 101" rather than the hole 101' configured to expose the first film 200 outside. The hole 101" is configured to pass a flexible circuit board 151" there through and the flexible circuit board 151 is configured to transmit a signal of the display 151.

According to at least one embodiment described above, the back surface of the display unit may be attached to the case, such that the size of the bezel positioned in an edge portion can be prevented from increasing.

Furthermore, the large area of the back surface of the display unit may be attached to the front case and a predetermined adhesive strength or more can be recurred. When separating the display 151 from the front case, the user can apply a predetermined force to the end of the first film and separate the display unit easily. Accordingly, the damage to the display unit can be prevented.

When a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a display unit;
   a first film having a first surface coated with a first adhesive material, the first surface of the first film coupled to a back surface of the display unit by the first adhesive material; and
   a front case having a first surface coated with a second adhesive material, the first surface of the front case coupled to a second surface of the first film by the second adhesive material,
   wherein an adhesive strength of the first adhesive material is weaker than an adhesive strength of the second adhesive material, and
   wherein the first film comprises a non-attaching end, and the front case is shaped to form a hole through the first surface of the front case such that the non-attaching end corresponding to the hole does not contact the first surface of the front case and the second adhesive material.

2. The mobile terminal according to claim 1, wherein the non-attaching end is formed at one corner area of the first film, and the hole is positioned adjacent to a corner of the front case.

3. The mobile terminal according to claim 1, wherein the non-attaching end comprises a projection projected convexly.

4. The mobile terminal according to claim 3, wherein the non-attaching end is formed by cutting away a corner of the first film in a stepped shape.

5. The mobile terminal according to claim 1, wherein an angular portion of the non-attaching end is rounded.

6. The mobile terminal according to claim 1, wherein the second adhesive material is not coated on at least one corner of the front case and the at least one corner is not attached to the first film.

7. The mobile terminal according to claim 1, wherein the first adhesive material coated on the first surface of the first film comprises silicon.

8. The mobile terminal according to claim 1, wherein the first film comprises one of Polyethylene Terephthalate, Polyethylene, or Polypropylene.

9. The mobile terminal according to claim 1, wherein the first adhesive material of the first film has an adhesive strength within a range of 3 gf/in to 30 gf/in.

10. The mobile terminal according to claim 1, further comprising:
   a window glass coupled to a front surface of the display unit, wherein a length of the window glass is longer than a length of the display unit in a vertical direction such that the window glass has at least one extended portion; and
   a window tape coupled to the at least one extended portion of the window glass to be attached to the front case.

11. The mobile terminal according to claim 1, wherein the display unit comprises an organic light emitting diode (OLED).

12. The mobile terminal according to claim 1, wherein the display unit is bent curvedly, and the front case is bent curvedly such that a shape of the front case corresponds to a shape of the display unit.

13. The mobile terminal according to claim 2, wherein a shape of the one corner area of the first film is different from a shape of other corner areas of the first film.

14. A mobile terminal comprising:
   a display unit;
   a first film having a first surface coated with a first adhesive material, the first surface of the first film coupled to a back surface of the display unit by the first adhesive material, wherein the first film comprises a non-attaching end;
   a front case having a first surface, wherein the front case is shaped to form a hole through the first surface of the front case such that the non-attaching end of the first film corresponds to the hole of the front case; and
   a second film disposed between the front case and the first film, the second film having a first surface facing the first film and a second surface facing the front case, wherein the first surface of the second film is coated with a second adhesive material, and the second surface of the second film is coated with a third adhesive material,
   wherein the first surface of the second film is coupled to the a second surface of the first film by the second adhesive material,
   wherein the second surface of the second film is coupled to the first surface of the front case by the third adhesive material, and
   wherein the non-attaching end of the first film does not contact the first surface of the front case, the first surface of the second film, the second adhesive material, and the third adhesive material.

15. The mobile terminal according to claim 14, wherein the third adhesive material comprises Thrimethylated silica.

16. The mobile terminal according to claim 14, wherein:
   a shape of one corner area of the first film is different from a shape of other corner areas of the first film; and
   a shape of one corner area of the second film, corresponding to the one corner area of the first film, is different from a shape of other corner areas of the second film.

* * * * *